United States Patent

Satoh et al.

[11] Patent Number: 6,014,672
[45] Date of Patent: Jan. 11, 2000

[54] INFORMATION RETRIEVAL SYSTEM

[75] Inventors: Kenji Satoh; Susumu Akamine; Kazunori Muraki, all of Tokyo, Japan

[73] Assignee: NEC Corporation, Tokyo, Japan

[21] Appl. No.: 08/912,367

[22] Filed: Aug. 18, 1997

[30] Foreign Application Priority Data

Aug. 19, 1996 [JP] Japan .................................. 8-235953

[51] Int. Cl.[7] ............................................. G06F 9/00
[52] U.S. Cl. .............................................. 707/102
[58] Field of Search ......................................... 707/1–206

[56] References Cited

U.S. PATENT DOCUMENTS

| | | | |
|---|---|---|---|
| 5,222,234 | 6/1993 | Wang et al. | 707/3 |
| 5,299,122 | 3/1994 | Wang et al. | 707/2 |
| 5,301,314 | 4/1994 | Gifford et al. | 707/101 |
| 5,655,128 | 8/1997 | Fushimoto | 395/760 |
| 5,805,746 | 9/1998 | Miystake et al. | 348/642 |
| 5,822,577 | 10/1998 | Ekanadham et al. | 395/587 |
| 5,825,869 | 10/1998 | Brooks et al. | 379/265 |

FOREIGN PATENT DOCUMENTS

| | | |
|---|---|---|
| 62-131333 | 6/1987 | Japan . |
| 63-191271 | 8/1988 | Japan . |
| 2-041564 | 2/1990 | Japan . |
| 2-247778 | 10/1990 | Japan . |
| 3-189766 | 8/1991 | Japan . |
| 4-086950 | 3/1992 | Japan . |
| 5-046685 | 2/1993 | Japan . |
| 5-46685 | 2/1993 | Japan . |
| 6-282584 | 10/1994 | Japan . |
| 06/325101 | 11/1994 | Japan . |
| 08/006955 | 1/1996 | Japan . |

OTHER PUBLICATIONS

Satoh, Kenji and Muraki, Kazunoi, "Personal Text Base", Proceedings of the 6th Annual Conference of JSAI 1992 (Jun. 24–26, 1992), pp. 351–354.

Primary Examiner—Thomas G. Black
Assistant Examiner—John M. Mills
Attorney, Agent, or Firm—Foley & Lardner

[57] ABSTRACT

A system which allows utilization of retrieval terms used in retrievals performed formerly by an outsider to facilitate and accelerate retrieval of documents. A history storage apparatus stores retrieval histories each having information including a group of retrieval items including at least an item of "retrieving person", retrieval terms and a retrieval result. A history storage section stores, when retrieval of documents is performed, a retrieval history regarding the retrieval into the history storage apparatus. A history retrieval section retrieves, in "retrieval which is performed utilizing a retrieval history", a retrieval history which satisfies designations of terms of an inputted retrieval item from among the retrieval histories by another retrieving person stored in the retrieval storage apparatus. A retrieval section retrieves documents utilizing retrieval terms of a retrieval history by the other retrieving person detected by the history retrieval section.

10 Claims, 4 Drawing Sheets

FIG. 2

HISTORY STORAGE APPARATUS

RETRIEVING PERSON INDEX

| RETRIEVING PERSON | NO. |
|---|---|
| akamine | #2 |
| satoh | #1, #3 |

TERMINAL INDEX

| TERMINAL | NO. |
|---|---|
| 1 | #1, #3 |
| 2 | #2, ... |

KEYWORD INDEX

| KEYWORD | NO. |
|---|---|
| Gbyte | #1, ... |
| Information | #1, #3, ... |

RETRIEVAL HISTORY GROUP

| NO. | RETRIEVAL TIME | RETRIEVING PERSON | RETRIEVING TERMINAL | RETRIEVAL TERMS | RETRIEVAL RESULT |
|---|---|---|---|---|---|
| 1 | 1996/3/18 10:12-10:35 | satoh | #1 | Information 0.15, Retrieval 0.5 | #5, #8, #10, ... |
| 2 | 1996/3/18 15:18-15:42 | akamine | #2 | OCR 0.33, Retrieval 0.25, Index 0.5 | #5, #32, ... |
| 3 | 1996/3/19 15:40-15:58 | satoh | #1 | #1, Gbyte 0.33 | #5, #10, ... |
| 4 | | | | | |
| 5 | | | | | |
| 6 | | | | | |

INFORMATION RETRIEVAL SYSTEM

BACKGROUND OF THE INVENTION

1. Field of the Invention

This invention relates to an information retrieval system which retrieves documents stored in a storage apparatus (document storage apparatus) based on inputted retrieval terms including a plurality of keywords, weights of the keywords and so forth.

2. Description of the Related Art

In conventional information retrieval systems which are normally realized by an information retrieval apparatus, an electronic filing apparatus and so forth, it is an ordinary technique to store retrieval histories to facilitate re-retrieval of documents which have been retrieved once in the past.

For example, in an electronic filing apparatus disclosed in Japanese Patent Laid-Open Application No. Heisei 5-46685, histories of operations and retrievals for documents are stored in advance, and when re-retrieval by a retrieving person is to be performed, those documents which have been retrieved in the past by the retrieving person are displayed in order.

However, such conventional information retrieval systems cannot be used for retrieval of a document which has not been retrieved by a retrieving person itself in the past. Therefore, for such retrieval, new retrieval terms are presented to effect retrieval of documents to be retrieved, and if it is determined necessary based on a result of the retrieval, then new retrieval terms must be presented. Consequently, much time and complicated operations are required for such retrieval.

The conventional information retrieval systems described above have the following problems.

The first problem resides in that a retrieval history of an outsider cannot be referred to. The reason is that, in the conventional information retrieval systems, only re-utilization of a retrieval history regarding retrievals performed in the past by the retrieving person itself is taken into consideration.

The second problem resides in that a retrieval term cannot be searched based on a similarity of retrieval terms. The reason is that, when "re-utilization of a retrieval history of retrievals performed in the past by the retrieving person itself" is to be performed as in the conventional information retrieval systems, since information of the time of retrieval, a result of the retrieval and so forth can be utilized as elements for searching for a retrieval term (such retrieval elements are well known to the retrieving person since the retrieval has been performed formerly by the retrieving person itself), the conventional information retrieval systems do not attach great importance to a similarity between retrieval terms.

The problems described above fundamentally originate from the fact that the conventional information retrieval systems "cannot utilize retrieval terms in a retrieval history of retrievals performed formerly by an outsider."

SUMMARY OF THE INVENTION

It is an object of the present invention to provide an information retrieval system which allows utilization of retrieval terms used in retrievals performed formerly by an outsider so as to facilitate retrieval.

It is another object of the present invention to provide an information retrieval system which can search, when to search for a retrieval history in order to utilize retrieval terms of an outsider, a retrieval term proximate to an object of retrieval of a retrieving person itself readily from retrieval histories.

In order to attain the objects described above, according to an aspect of the present invention, there is provided an information retrieval system, comprising a history storage apparatus for storing retrieval histories each having information including a group of retrieval items including at least an item of "retrieving person", retrieval terms and a retrieval result, history storage means for storing, when retrieval of documents is performed, a retrieval history regarding the retrieval into the history storage apparatus, history retrieval means for retrieving, in "retrieval which is performed utilizing a retrieval history", a retrieval history which satisfies designations of terms of an inputted retrieval item from among the retrieval histories by another retrieving person stored in the retrieval storage apparatus, and retrieval means for retrieving documents utilizing retrieval terms of a retrieval history by the other retrieving person detected by the history retrieval means.

According to another aspect of the present invention, there is provided an information retrieval system, comprising a history storage apparatus for storing retrieval histories each having information including retrieval terms and a retrieval result, history storage means for storing, when retrieval of documents is performed, a retrieval history regarding the retrieval into the history storage apparatus, history retrieval means for retrieving, in "retrieval which is performed utilizing a retrieval history", a group of retrieval histories which have retrieval terms similar to an inputted retrieval term from within the retrieval storage apparatus, similar term retrieval means for sequencing the group of retrieval histories detected by the history retrieval means based on a similarity of retrieval terms and presenting the sequenced group of retrieval histories, and retrieval means for retrieving documents utilizing retrieval terms of a retrieval history designated by a retrieving person from within the group of retrieval histories presented by the similar term retrieval means.

According to a further aspect of the present invention, there is provided an information retrieval system, comprising a history storage apparatus for storing retrieval histories each having information including a group of retrieval items, retrieval terms and a retrieval result, history storage means for storing, when retrieval of documents is performed, a retrieval history regarding the retrieval into the history storage apparatus, history retrieval means for retrieving, in "retrieval which is performed utilizing a retrieval history", a group of retrieval histories which satisfy designations of terms of an inputted retrieval item and have retrieval terms similar to an inputted retrieval term from within the retrieval storage apparatus, similar term retrieval means for sequencing the group of retrieval histories detected by the history retrieval means based on a similarity of retrieval terms and presenting the sequenced group of retrieval histories, and retrieval means for retrieving documents utilizing retrieval terms of a retrieval history designated by a retrieving person from within the group of retrieval histories presented by the similar term retrieval means.

According to a still further aspect of the present invention, there is provided an information retrieval system, comprising a history storage apparatus for storing retrieval histories each having information including a group of retrieval items including at least an item of "retrieving person", retrieval terms and a retrieval result, history storage means for storing, when retrieval of documents is performed, a retrieval history regarding the retrieval into the history storage apparatus, history retrieval means for retrieving, in "retrieval which is performed utilizing a retrieval history", a group of retrieval histories by another retrieving person which have retrieval terms similar to an inputted retrieval term and satisfy a designation of a term of an inputted retrieval item from within the retrieval storage apparatus, similar term retrieval means for sequencing the group of retrieval histories detected by the history retrieval means based on a similarity of retrieval terms and presenting the sequenced group of retrieval histories, and retrieval means for retrieving documents utilizing retrieval terms of a retrieval history designated by a retrieving person from within the group of retrieval histories presented by the similar term retrieval means.

In the information retrieval systems described above, the similar term retrieval means may calculate the similarity of retrieval terms as an "inner product of weighted vectors of keywords which coincide with each other in the two retrieval terms of an object of comparison". Further, the history retrieval means may produce a product set of the retrieval result in the retrieval history and a result of retrieval performed based on an added keyword as a retrieval result of the current retrieval.

The information retrieval systems of the present invention described above are advantageous in that a retrieving person can utilize (use) retrieval terms of a retrieval history in the past by another person. As a result, the time and labor required for the retrieving person to input retrieval terms can be reduced remarkably and retrieval term setting operation is facilitated. Further, since a retrieval result of the retrieval history in the past by the other person can be used, retrieval from the document storage apparatus can be omitted. Consequently, the retrieval speed can be improved.

Such advantages arise from the fact that, when retrieval is performed, a retrieval history regarding the retrieval (a retrieval history having retrieval items of the retrieving person) is automatically stored entirely into the history storage apparatus, and when an instruction is received, the retrieval history is retrieved and presented to a retrieving person.

The information retrieval systems are advantageous also in that a retrieval history having retrieval terms similar to retrieval terms inputted by a retrieving person can be preferentially retrieved from within the history storage apparatus. As a result, information which can be referred to when the retrieving person tries to modify the retrieval terms or the like can be obtained readily, and the time and labor required for the entire retrieval can be reduced.

This advantage arises from the fact that a group of retrieval histories which include the same keywords as keywords in inputted retrieval terms is detected and is re-arranged based on similarities of retrieval terms and the retrieval histories re-arranged in this manner are presented to the retrieving person.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view illustrating an example of retrieval histories and data structures and contents of data of indices stored in a history storage apparatus shown in FIG. 1;

DESCRIPTION OF THE PREFERRED EMBODIMENTS

1. First Embodiment

Figure 1:
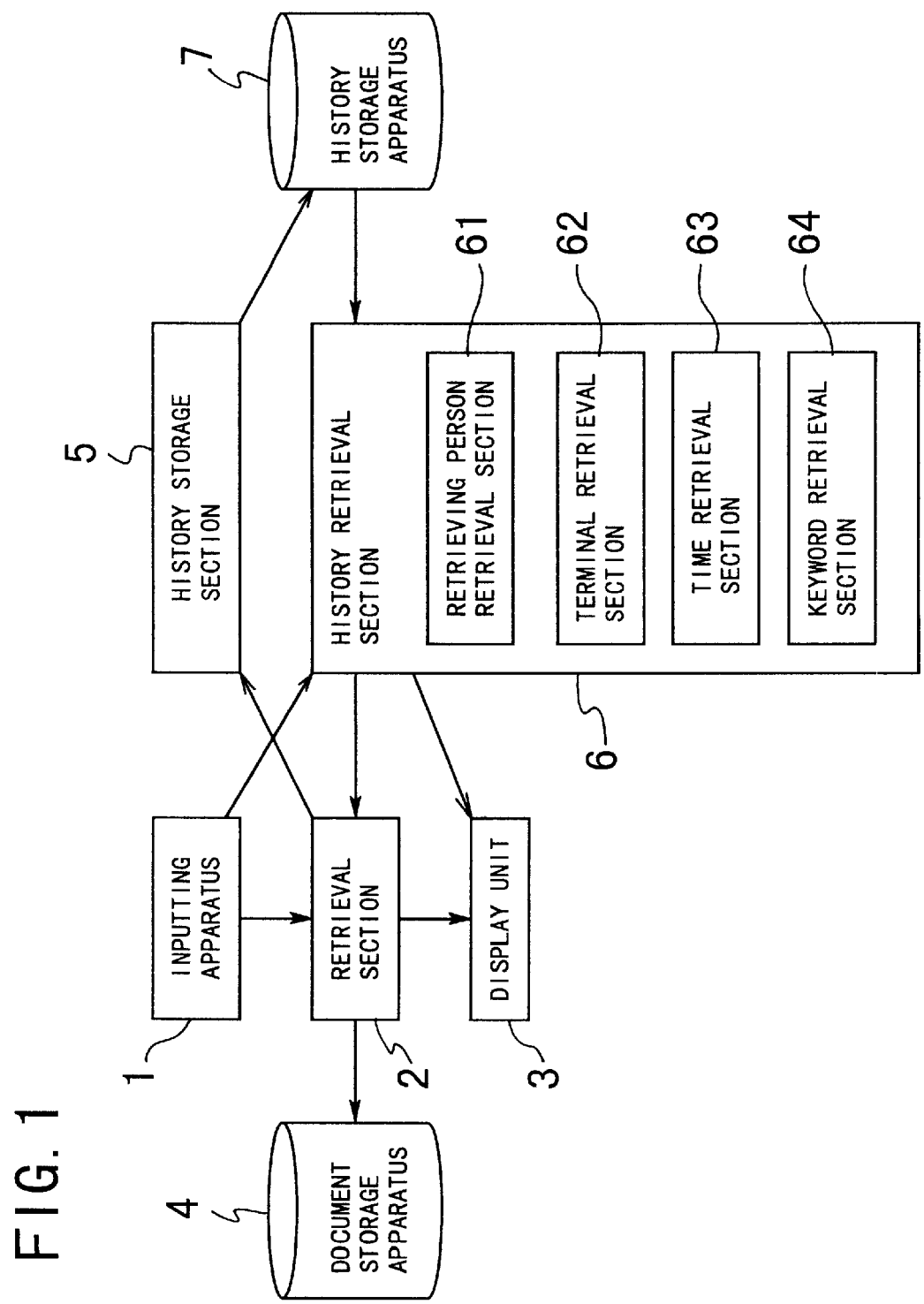
FIG. 1 is a block diagram of an information retrieval system showing a first preferred embodiment of the present invention.

Referring first to FIG. 1, there is shown an information retrieval system according to a first preferred embodiment of the present invention. The information retrieval system includes an inputting apparatus 1 which may be realized by a keyboard apparatus or some other suitable apparatus, a document storage apparatus 4 for storing documents, a retrieval section 2 for retrieving documents in the document storage apparatus 4, a display unit 3 which may be realized by a display unit, a printer or some other suitable apparatus, a history storage apparatus 7 for storing retrieval histories, a history storage section 5 for collecting retrieval histories representative of histories of retrieval and storing the retrieval histories into the history storage apparatus 7, and a history retrieval section 6 for retrieving a retrieval history in the history storage apparatus 7.

The history retrieval section 6 includes a retrieving person retrieval section 61 for retrieving retrieval histories with a retrieving person, a terminal retrieval section 62 for retrieving a retrieval history with a terminal, a time retrieval section 63 for retrieving retrieval histories with a retrieval time, and a keyword retrieval section 64 for retrieving retrieval histories with keywords of retrieval terms. It is to be noted that, in the present specification, a searching person, a terminal and a retrieval time which may each be used as a key upon retrieval of retrieval histories are generally called "retrieval items", and those items and a keyword are generally called "retrieval elements".

FIG. 2 illustrates retrieval histories and data structures and detailed contents (data) of indices in the history storage apparatus 7. Retrieval histories are sorted and stored in order of the retrieval time in the history storage apparatus 7. Each of the retrieval histories has a history number (indicated by "No." in FIG. 2), a retrieval time, a retrieving person, a terminal, retrieval terms and a retrieval result.

As seen from FIG. 2, when a retrieval history is to be stored into the history storage apparatus 7, a retrieving person index, a terminal index and a keyword index are added so that the retrieval history can be retrieved readily also from any of the indices. It is to be noted that the reason why the history storage apparatus 7 illustrated in FIG. 2 does not include a "retrieval time index" is that the retrieval histories illustrated in FIG. 2 are already in a sorted state based on the retrieval time. Accordingly, otherwise where the retrieval histories are in a sorted state based on some other retrieval factor, the history storage apparatus 7 includes a "retrieval date index" in place of the index for the retrieval factor.

Figure 3:
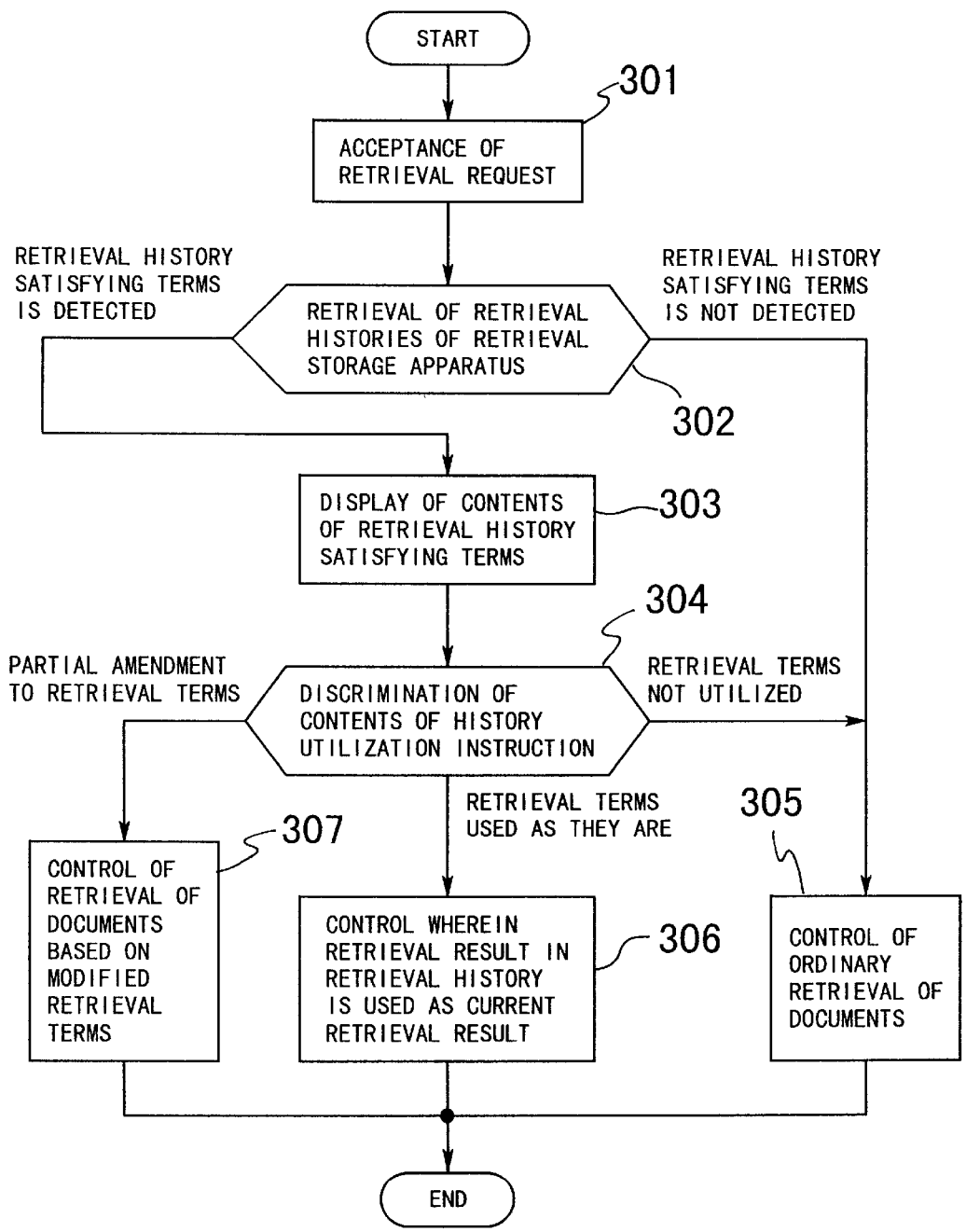
FIG. 3 is a flow chart illustrating processing of a history retrieval section of the information retrieval system shown in FIG. 1.

FIG. 3 illustrates in flow chart processing of the history retrieval section 6 when a retrieving person performs retrieval making use of a retrieval history. Referring to FIG. 3, the processing illustrated includes a retrieval request acceptance step 301, a retrieval history retrieval step 302, a retrieval history contents display step 303, a retrieval utilization instruction contents discrimination step 304, an ordinary document retrieval control step 305, a retrieval history retrieval result utilization control step 306 and a modification retrieval term document retrieval control step 307.

Operation of the information retrieval system of the first embodiment having such a construction as described above is described below with reference to FIGS. 1 to 3.

First, operation of the information retrieval system when a retrieving person performs ordinary retrieval (which is retrieval other than "retrieval which is performed utilizing a retrieval history" which will be hereinafter described) is described.

When a retrieving person performs ordinary retrieval, the documents in the document storage apparatus 4 are retrieved by the retrieval section 2 and a retrieval history (refer to FIG. 2) of the retrieval is automatically stored into the history storage apparatus 7 by the history storage section 5. In the following, details of the procedure are described in order of time.

The retrieving person will input retrieval terms using the inputting apparatus 1 and instruct the information retrieval apparatus to execute retrieval.

In response to the retrieval execution instruction, the retrieval section 2 searches for those documents which conform to the inputted retrieval terms from within the document storage apparatus 4.

After the retrieval comes to an end, the retrieval section 2 sends a result of the retrieval to the display unit 3 so that it is presented to the retrieving person. In particular, the retrieval section 2 searches the documents in the document storage apparatus 4 based on the retrieval terms inputted from the inputting apparatus 1 and displays a result of the retrieval on the display unit 3.

When the result of the retrieval is to be sent to the display unit 3, the retrieval section 2 sends information representative of the retrieving person, terminal, retrieval time, retrieval terms and result of the retrieval to the history storage section 5.

When the retrieval is performed by the retrieval section 2, the history storage section 5 produces history data having the retrieving person who performs the retrieval, the terminal which is used for the retrieval, the retrieval time (date and hour) at which the retrieval is performed, the retrieval terms inputted in the retrieval and the result of the retrieval.

Further, the history storage section 5 stores a retrieval history, which includes the history data and a history number, into the history storage apparatus 7. Thereupon, the retrieval history is stored into the retrieving person index, the terminal index and the keyword index in the history storage apparatus 7 using the retrieving person, the terminal and the keywords in the retrieval terms as index keys, respectively.

Again, an example of the retrieval histories, the data structures in the indices and the data stored into the history storage apparatus 7, in such a manner as described above, is illustrated in FIG. 2.

Now, operation of the information retrieval system when a retrieving person performs retrieval making use of a retrieval history (refer to FIG. 3) is described.

In this instance, the retrieving person can effect retrieval of a retrieval history in the history storage apparatus 7 based on a combination of the name of another retrieving person of retrieval performed formerly (in the past) and some other retrieval element (retrieval date and time, terminal name, and a keyword in retrieval terms) (however, use of a retrieval element such as a retrieving person is not an essential requirement). Here, one of the characteristics of the present invention resides in that a history of retrieval performed formerly by an outsider can be retrieved making use of the name of the second person (retrieving person).

The retrieving person will input a request for retrieval including part or all of the retrieval elements (including at least the retrieving person) using the inputting apparatus 1 and enters an instruction to execute retrieval of a retrieval history.

The history retrieval section 6 receives the retrieval request for a retrieval history inputted from the inputting apparatus 1 (step 301). Then, in response to the retrieval request, the history retrieval section 6 looks up the retrieving person index using the retrieving person retrieval section 61, looks up the terminal index using the terminal retrieval section 62, looks up the keyword index using the keyword retrieval section 64 and delimits the retrieval time of a retrieval history using the time retrieval section 63 to perform retrieval of a retrieval history in the history storage apparatus 7 (searches for a retrieval history which coincides with terms according to the retrieval elements from within the retrieval history group in the history storage apparatus 7) (step 302).

If retrieval histories which coincide with the terms are detected from within the retrieval histories in the history storage apparatus 7, the history retrieval section 6 displays contents of the retrieval histories on the display unit 3 (step 303). It is to be noted that, when no pertaining retrieval history is detected, control is passed to the retrieval section 2 so that ordinary retrieval of documents may be performed (step 305).

The retrieving person will refer to the retrieval histories presented by the display unit 3 and input history utilization instructions having contents of the following items ① to ④ through the inputting apparatus 1:

① Instruction indicting whether or not a retrieval history should be utilized;

② Instruction indicating, when a retrieval history should be utilized, which one of retrieval histories should be utilized;

③ Instruction indicating whether retrieval terms in the retrieval history to be utilized should be utilized as they are or utilized with some modification thereto; and ④ Instruction indicating, where the retrieval terms should be utilized with some modification thereto, contents of the modification.

In this manner, the retrieving person can utilize the retrieval terms in a retrieval history detected by the history retrieval section 6 as they are or, if necessary, can modify the retrieval terms to effect retrieval of documents.

The history retrieval section 6 discriminates, when the history utilization instructions are received, contents of them (step 304) and performs the following processing based on a result of the discrimination.

In particular, if it is discriminated in step 304 that the instruction indicating that "a retrieval history should not be utilized" is detected, then the history retrieval section 6 passes control to the retrieval section 2 so that ordinary retrieval of a document may be performed (step 305).

However, if it is discriminated in step 304 that the instruction indicating that "a retrieval history should be utilized and the retrieval terms in the retrieval history should be utilized as they are" is detected, then the history retrieval section 6 passes control to the retrieval section 2 so that the result of retrieval in the retrieval history (retrieval history having the retrieval terms) may be adopted as a result of retrieval of the current retrieval of documents (step 306). The retrieval section 2 displays the retrieval result on the display unit 3.

Further, if it is discriminated in step 304 that the instruction indicating that "a retrieval history should be utilized and the retrieval terms of the retrieval history should be modified to effect retrieval of a document" is detected, then the history retrieval section 6 passes control to the retrieval section 2 together with the modified retrieval terms (step 307). Consequently, retrieval of documents in the document storage apparatus 4 based on the modified retrieval terms is performed.

It is to be noted that, also when the retrieving person performs retrieval utilizing a retrieval history, the history storage section 5 stores a retrieval history indicating the history of retrieval also into the history storage apparatus 7. Thereupon, a utilized history number is described in the column of the retrieval terms as seen from the third retrieval history in FIG. 2. Further, also the retrieval history stored in this manner makes an object of retrieval by the history retrieval section 6 similarly to a retrieval history in a case wherein ordinary retrieval is performed.

The information processing system of the first embodiment described above is advantageous in that a retrieving person can perform retrieval utilizing retrieval terms in a retrieval history stored in the history storage apparatus 7 and regarding a retrieval performed formerly by an outsider and retrieval can be performed efficiently reducing operations required to input or modify retrieval terms.

2. Modifications to the First Embodiment

The information retrieval system of the first embodiment of the present invention described above may be modified in the following manner.

In particular, the information retrieval system is modified such that, when new retrieval is performed utilizing (modifying) a retrieval result of the history retrieval section 6 (a retrieval history detected as that which satisfies predetermined terms), the retrieval section 2 performs retrieval using a retrieval result in the retrieval history.

More particularly, the modified information retrieval system is constructed such that, when retrieval is performed utilizing retrieval terms in a retrieval history but adding a different keyword to keywords in the retrieval terms, document numbers of the retrieval result in the retrieval history and document numbers of a retrieval result when the document storage apparatus 4 is retrieved in an ordinary way using only the added keyword as a retrieval term are combined by set operation (a product set of the two retrieval results is operated) to obtain a retrieval result of the current retrieval rapidly.

In short, in operation of the modified information retrieval system, if it is discriminated in step 304 in FIG. 3 that "the instruction indicating that a retrieval history should be utilized and retrieval terms in the retrieval history should be modified to effect retrieval of documents" is detected and besides contents of the modification are addition of a keyword, then the history retrieval section 6 performs processing recited in ① to ③ below:

① To hold document numbers of the retrieval result in the retrieval history;

② To cause the retrieval section 2 to perform ordinary retrieval for the document storage apparatus 4 based on the retrieval term including only the newly added keyword and get document numbers of a result of the retrieval; and ③ To calculate a product sum between the document numbers of ① and the document numbers of ② to produce a retrieval result of the current retrieval and pass control to the retrieval section 2 so that the retrieval result may be made a retrieval result of the current retrieval of documents (the retrieval section 2 displays the retrieval result on the display unit 3).

The modified information retrieval system described above is advantageous in that, when retrieval is performed adding a keyword to the exisiting retrieval terms in a retrieval history, since retrieval of documents based on the exisiting retrieval terms is not performed by retrieval of the document storage apparatus 4 but can be performed utilizing a retrieval result in the retrieval terms (information in the history storage apparatus 7), retrieval of documents is accelerated.

3. Second Embodiment

Figure 4:
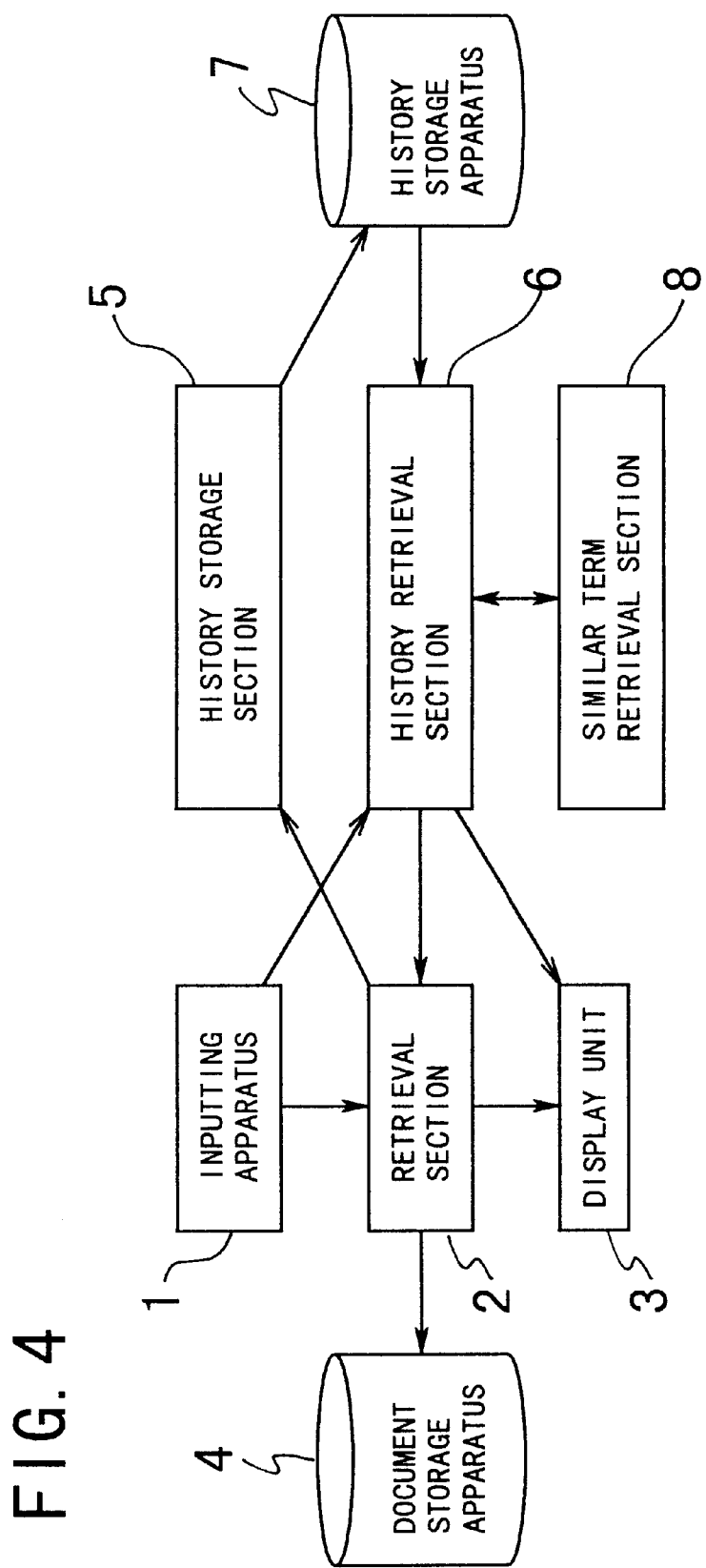
FIG. 4 is a block diagram of another information retrieval system showing a second preferred embodiment of the present invention.

FIG. 4 shows in block diagram form a construction of an information retrieval system according to a second preferred embodiment of the present invention. Referring to FIG. 4, the information retrieval system shown includes a similar term retrieval section 8 in addition to the components of the information retrieval system of the first embodiment shown in FIG. 1. In other words, the present information retrieval system is different from the information retrieval system of the first embodiment in that it additionally includes the similar term retrieval section 8.

When an instruction to retrieve a retrieval history based on a similarity between retrieval terms is received, the similar term retrieval section 8 detects all of those retrieval histories which have at least one keyword same as one of keywords in retrieval terms inputted by a retrieving person, re-arranges the retrieval histories in a descending order of similarity of retrieval terms and presents the re-arranged retrieval histories to the retrieving person.

Further, contents of processing of the history retrieval section 6 in the information retrieval system of the second embodiment are somewhat different from contents of processing of the history retrieval section 6 in the information retrieval system of the first embodiment. Due to the difference, the components represented by reference numerals 61 to 64 are not shown in the history retrieval section 6 in FIG. 4.

Again, retrieval histories and data structures and detailed contents (data) of indices stored in the history storage apparatus 7 in the information retrieval system of the present embodiment are illustrated in FIG. 2.

The information retrieval system of the present embodiment having the construction described above operates in the following manner. Here, operation peculiar to the present information retrieval system is described.

When a retrieving person tries to perform ordinary retrieval, the information retrieval system operates in a similar manner to the information retrieval system of the first embodiment.

When a retrieving person tries to perform retrieval utilizing a retrieval history, the information retrieval system operates in one of two different manners.

First, operation of the information retrieval system when a retrieving person inputs retrieval terms through the inputting apparatus 1 and enters an instruction to retrieve retrieval histories based on a similarity of retrieval terms is described.

The history retrieval section 6 detects, using the keyword index (refer to FIG. 2) in the history storage apparatus 7, all of those retrieval histories which have at least one of keywords in a keyword group of the inputted retrieval terms.

The similar term retrieval section 8 sequences the retrieval histories detected by the history retrieval section 6 based on a similarity of retrieval terms, that is, based on a similarity between any of the inputted retrieval terms and any of retrieval terms of each of the retrieval histories detected by the history retrieval section 6. Here, calculation of a similarity of retrieval terms is realized by using a calculation expression for calculating, for example, where retrieval terms are an array of weighted keywords (such as illustrated in FIG. 2), a sum total of products of weights of coincident keywords (inner product of weighted vectors of the keywords).

Further, the similar term retrieval section 8 presents, after similarities between retrieval terms are calculated, the retrieval histories to the retrieving person in a descending order of the similarity using the display unit 3.

On the other hand, when the retrieving person inputs retrieval terms and terms of retrieval elements such as a retrieving person for a retrieval history through the inputting apparatus 1 and enters an instruction to retrieve a retrieval history based on a similarity of retrieval terms, the information retrieval system operates in the following manner. It is to be noted that, in this instance, for retrieval histories, retrieval based on a term of a retrieval element and retrieval based on a similarity are performed in combination.

The history retrieval section 6 looks up, using the keyword index in the history storage apparatus 7 (refer to FIG. 2), all of those retrieval histories which have at least one of the keywords of the keyword group of the inputted retrieval terms.

Further, the history retrieval section 6 extracts, from the retrieval histories detected in this manner, those retrieval histories which satisfy the terms for the retrieval history (terms of the retrieval elements such as a retrieving person).

By this processing, the history retrieval section 6 detects those retrieval histories which have at least one of the keywords of the inputted retrieval terms and satisfy all of the inputted terms for the retrieval history.

"Calculation of a similarity of retrieval terms" and "presentation of a retrieval history group to a retrieving person" by the similar term retrieval section 8 are similar to those in the operation of the first case described above.

With the information retrieval system of the second embodiment of the present invention, even if a retrieving person does not know a fact that some other person has performed retrieval for a similar field formerly, the retrieving person can search for a retrieval history of a person who has performed retrieval in a similar field using a retrieval term being inputted or a retrieval term during modification with which retrieval has been performed whereas a final result has not been reached. Thus, the information retrieval system is advantageous in that, in such a case that it is puzzled, during retrieval, what keyword should be inputted, a new keyword can be found out readily and added or modified by referring to or utilizing a retrieval history of an outside, i.e., other, person.

Detailed working examples corresponding to the embodiments and modification described above are described below.

4. FIRST WORKING EXAMPLE

First, a working example corresponding to the first embodiment of an information retrieval system of the present invention is described.

In the present working example, it is assumed that, as seen in FIG. 2, for example, a retrieval history indicating contents that a retrieving person whose name is "satoh" performed retrieval on "Mar. 18, 1996" from a terminal "#1" using keywords of "Information" and "Retrieval" and is present in the history storage apparatus 7.

Now, a case is examined wherein a retrieving person knows that "satoh performed retrieval in a field of information retrieval on Mar. 18, 1996" and performs retrieval of documents while it wants itself to obtain a retrieval result in a similar field.

In this instance, it is easier for the retrieving person to search for a retrieval history that "satoh retrieved on Mar. 18, 1996" and perform retrieval utilizing retrieval terms of the retrieval history than to input keywords such as "Information" and "Retrieval" and modify the retrieval request based on a result of the retrieval based on the keywords.

In this instance, the history retrieval section 6 in the information retrieval system of the first embodiment described above looks up "satoh" from the retrieving person index for the retrieval histories shown in FIG. 2 and obtains $\{1, 3, \ldots\}$ as a set of history numbers.

The history retrieval section 6 searches, by the time retrieval section 63 thereof, for one of the retrieval histories having the history numbers included in the set which includes Mar. 18, 1996 as the retrieval time and obtains the first retrieval history in FIG. 2 as a history result. Then, the history retrieval section 6 presents the history result (first retrieval history in FIG. 2) to the retrieving person using the display unit 3.

The retrieving person thereafter performs such an operation as to modify the retrieval terms and performs retrieval making use of the presented retrieval history. Consequently, the retrieving person can obtain a result of the retrieval of object documents.

5. SECOND WORKING EXAMPLE

Now, a working example corresponding to the modification to the first embodiment of the information retrieval system of the present invention is described.

In the present working example, a case is examined wherein retrieval terms are utilized from a retrieval history detected by the history retrieval section 6 and partially modified (addition of a keyword) and an instruction to retrieve documents based on the modified retrieval terms is entered.

In this instance, the modified information retrieval system does not retrieve documents in the document storage apparatus 4 using the retrieval terms with the keyword added as they are, but performs retrieval of documents using the retrieval result of the retrieval history.

For example, if the retrieving person enters an instruction to retrieve documents based on the keywords of the retrieval terms of the first retrieval history in FIG. 2 ("Information" and "Retrieval") and the keyword of "OCR" added newly, a product set of the set $\{5, 8, 10, \ldots\}$ of document numbers of the retrieval result of the first retrieval history and a set of document numbers of documents of a result of the retrieval based on "OCR" is operated, and a result of the operation is displayed as a result of the current retrieval on the display unit 3.

6. THIRD WORKING EXAMPLE

Finally, a working example corresponding to the second embodiment of the information retrieval system of the present invention is described.

Now, it is assumed that the retrieval histories illustrated in FIG. 2 are stored in the history storage apparatus 7. Here, a case is examined wherein, after the retrieving person intending to perform retrieval of documents inputs retrieval terms of "Retrieval 0.6, Index 0.5" (the numeral following each keyword indicates the weight to the keyword), it is puzzled which retrieval keyword should be added and thus enters an instruction to retrieve retrieval histories based on a similarity of retrieval terms.

In this instance, the history retrieval section 6 in the information retrieval system of the second embodiment looks up "Retrieval" and "Index" from within the keyword index in the history storage apparatus 7. In the example described, the history numbers 1 to 3 of the retrieval history group in FIG. 2 are detected from within the keyword index.

Thereafter, the similar term retrieval section 8 calculates a similarity between the retrieval terms of the individual retrieval histories of the retrieval numbers and the retrieval terms designated in the current retrieval.

The retrieval terms of the first and third retrieval histories exhibit coincidence only in terms of the keyword of "Retrieval" with the current retrieval terms. Further, the weight of the keyword is 0.6 in the current retrieval terms and 0.5 in the retrieval terms of the retrieval history. Accordingly, the coincidence degree of the retrieval terms is 0.3 (0.6×0.5).

Meanwhile, the retrieval terms of the second retrieval history exhibit coincidence in terms of the keywords of "Retrieval" and "Index" with the retrieval terms of the current retrieval. Further, the product of the weights of each keyword in the retrieval terms of the current retrieval and the retrieval terms of the retrieval history is 0.6×0.25=0.15 for "Retrieval" and 0.5×0.5=0.25 for "Index". Consequently, the similarity between the retrieval terms is the sum of the two values, that is, 0.4.

As a result of the calculation described above, the second retrieval history is presented first to the retrieving person by the display unit 3.

Further, if the retrieving person inputs, in addition to the retrieval terms described above, as a term for a retrieval history (term for a retrieval element), a term regarding the retrieval time of "from Mar. 19, 1996 to Mar. 20, 1996", then since the second retrieval history does not satisfy this term, another history which satisfies also this term and exhibits the highest similarity (first or third retrieval history in FIG. 2) is presented first to the retrieving person.

Having now fully described the invention, it will be apparent to one of ordinary skill in the art that many changes and modifications can be made thereto without departing from the spirit and scope of the invention as set forth herein.

What is claimed is:

1. An information retrieval system, comprising:
   a history storage apparatus for storing retrieval histories each having information including a group of retrieval items, a retrieval term comprised of at least one keyword, and a retrieval result;
   a history storage device for storing, when retrieval of documents is performed by a first person, a retrieval history regarding said retrieval into said history storage apparatus;
   an input device for inputting at least one of said retrieval terms by said first person and at least one of said group of retrieval items and said retrieval terms by a second person;
   a history retrieval device for retrieving from within said retrieval storage apparatus, a group of retrieval histories which satisfy a designation of an inputted retrieval item, said group of retrieval histories having a keyword of said retrieval term similar to an inputted keyword of said retrieval term;
   a similar term retrieval device for sequencing said group of retrieval histories detected by said history retrieval device based on a similarity of retrieval terms and presenting said sequenced group of retrieval histories; and
   a retrieval device for retrieving documents utilizing retrieval terms of a retrieval history designated by a retrieving person from within said group of retrieval histories presented by said similar term retrieval device.

2. An information retrieval system, comprising:
   a history storage apparatus for storing retrieval histories each having information including a group of retrieval items including at least an item of a retrieving person, a retrieval term comprised of at least one keyword, and a retrieval result;
   a history storage device for storing, when retrieval of documents is performed by a first person, a retrieval history regarding said retrieval into said history storage apparatus;
   an input device for inputting at least one of said retrieval terms by said first person and at least one of said group of retrieval items and said retrieval terms by a second person;
   a history retrieval device for retrieving from within said retrieval storage apparatus, a group of retrieval histories by at least said first retrieving person which have a keyword of said retrieval term similar to an inputted keyword of said retrieval term input by said second person, and said group of retrieval histories satisfy a designation of an element of an inputted retrieval item input by said second person;
   a similar term retrieval device for sequencing said group of retrieval histories detected by said history retrieval device based on a similarity of retrieval terms and presenting said sequenced group of retrieval histories; and
   a retrieval device for retrieving documents utilizing retrieval terms of a retrieval history designated by said second person from within said group of retrieval histories presented by said similar term retrieval device.

3. An information retrieval system as claimed in claim 1, wherein said similar term retrieval device calculates said similarity of retrieval terms as an inner product of weighted vectors of said keywords which coincide with each other in two retrieval terms of an object of comparison.

4. An information retrieval system as claimed in claim 2, wherein said similar term retrieval device calculates said similarity of retrieval terms as an inner product of weighted vectors of said keywords which coincide with each other in two retrieval terms of an object of comparison.

5. An information retrieval system as claimed in claim 1, wherein
   said history retrieval device produces a retrieval result of a current retrieval, by calculating a product set of
   a retrieval result of said first person in said retrieval history, and
   a retrieval result of a retrieval request by said second person, wherein said retrieval request by said second person is performed based upon at least one added keyword added by said second person.

6. An information retrieval system as claimed in claim 2, wherein said history retrieval device produces a retrieval result of a current retrieval, by calculating a product set of a retrieval result of said first person in said retrieval history, and a retrieval result of a retrieval request by said second person, wherein said retrieval request by said second person is performed based upon at least one added keyword added by said second person.

7. An information retrieval system as claimed in claim 1, wherein each of said retrieval histories includes information indicative of a history number, a retrieval time, a retrieving person, a terminal, a retrieval term and a retrieval result.

8. An information retrieval system as claimed in claim 2, wherein each of said retrieval histories includes information indicative of a history number, a retrieval time, a retrieving person, a terminal, a retrieval term and a retrieval result.

9. An information retrieval system as recited in claim 2, wherein said retrieval histories, that are stored in said history apparatus, further comprise at least one additional item, selected from a retrieval number, a retrieval time, and a retrieval terminal utilized, and wherein at least one of said additional items, that has been input by said second operator, is utilized to select among said stored retrieval histories for reporting to said second operator.

10. An information retrieval system as recited in claim 9, wherein at least one of said additional items, that has been input by said second operator, is further utilized to organize said selected retrieval histories for reporting to said second operator, and wherein said selected retrieval histories are also organized for reporting by utilizing a weighted similarity with at least one of said keywords of said retrieval term that has been inputted by said second operator.

\* \* \* \* \*